US005707960A

United States Patent [19]

Fukuyama et al.

[11] Patent Number: 5,707,960

[45] Date of Patent: Jan. 13, 1998

[54] AMORPHOUS SODIUM SILICATE-METAL SULFATE COMPOSITE POWDER

[75] Inventors: Yoshiki Fukuyama; Genji Taga, both of Shinnanyo, Japan

[73] Assignee: Tokuyama Corporation, Yamaguchi-ken, Japan

[21] Appl. No.: 605,374

[22] Filed: Feb. 22, 1996

[30] Foreign Application Priority Data

Feb. 23, 1995 [JP] Japan .................................. 7-034862

[51] Int. Cl.[6] .............................. C11D 7/14; C04B 33/32

[52] U.S. Cl. .......................... 510/531; 510/466; 510/511; 423/331; 423/332; 423/544; 423/551; 423/554

[58] Field of Search .................................. 510/511, 531, 510/466; 423/332, 468, 544, 331, 551, 554

[56] References Cited

U.S. PATENT DOCUMENTS

| | | | |
|---|---|---|---|
| 3,835,216 | 9/1974 | Almagro et al. | 423/332 |
| 3,879,527 | 4/1975 | Bertorelli et al. | 510/531 |
| 3,956,467 | 5/1976 | Bertorelli | 423/332 |
| 3,971,727 | 7/1976 | Bertorelli | 252/135 |
| 4,022,704 | 5/1977 | Balfanz et al. | 510/531 |
| 4,861,510 | 8/1989 | Wilms et al. | 423/328 |

FOREIGN PATENT DOCUMENTS 59-144727 8/1984 Japan .

*Primary Examiner*—Paul Lieberman
*Assistant Examiner*—Lorna M. Douyon
*Attorney, Agent, or Firm*—Wenderoth, Lind & Ponack

[57] ABSTRACT

Amorphous sodium silicate-metal sulfate composite powder having water softening power and having small hygroscopicity, and useful as a detergent builder is provided. This amorphous sodium silicate-metal sulfate composite powder is characterized in that it contains a metal sulfate, for example, sodium sulfate, as solid solution, and when the $SiO_2/Na_2O$ molar ratio is expressed by n and the specific surface area thereof is expressed by S ($m^2/g$), n and S satisfy the following expressions:

$$1.60 \leqq n \leqq 2.80$$

$$0.10 \leqq S \leqq 2.00$$

, provided that it is assumed that the molar number of $Na_2O$ is the molar number of $Na_2O$ based on sodium silicate, and does not contain the molar number of $Na_2O$ based on sodium sulfate in the case where the metal sulfate is sodium sulfate. This powder is prepared by grinding sodium silicate cullet containing the metal sulfate as solid solution.

11 Claims, 1 Drawing Sheet

AMORPHOUS SODIUM SILICATE-METAL SULFATE COMPOSITE POWDER

This invention relates to amorphous sodium silicate-metal sulfate composite powder which has water softening power, has small hygroscopicity and is useful as a detergent builder.

BACKGROUND OF THE INVENTION

Amorphous sodium silicate powder has been known from long ago. Amorphous sodium silicate cullet (sodium silicate glass pieces) as a representative example thereof is obtained by heat fusing siliceous sand, and sodium carbonate or sodium hydroxide, and its molar ratio n of of $SiO_2/Na_2O$ is, usually, 2 to 3.3. Water glass solution comprising amorphous sodium sillcate cullet having been dissolved in water under high pressure is a material having the most comprehensive uses in all the manufacturing industries, but amorphous sodium silicate cullet itself strongly tends to be used as an intermediate product, and there is no report about amorphous sodium silicate cullet being useful as a detergent builder.

The present inventors found that powder obtained by grinding amorphous sodium silicate cullet exhibits water softening power and can suitably be used as a detergent builder, and a patent application was made on the powder (Japanese Patent Application No. 61867/1994).

The present inventors presume that when sodium silicate powder is dissolved in water, Na ions are eluted first, and then, silicate ions are eluted. Further, they presume that the mechanism of water softening by sodium silicate powder is caused by the fact that the concentrations of Ca ions and Mg ions in water are lowered by the following reactions, respectively.

Ca ions: Ca ions bind to silicic acid remaining without being dissolved even after Na ions were eluted.

Mg ions: Silicate ions eluted bind to Mg ions to form precipitate of magnesium silicate.

Incidentally, it is known that Mg ions bind to $OH^-$ ions in the solution to form precipitate of magnesium hydroxide and thereby their concentration decreases, and Mg ion concentration in water is much smaller than Ca ion concentration therein. Thus, the present inventors considered that if sodium silicate capable of binding to more Ca ions had been prepared, namely if binding sites for Ca ions to silicic acid had been increased by making larger the amount of Na ions eluted from sodium silicate and, on the other hand, inhibiting dissolution of silicate ions, such sodium silicate would have larger water softening power. It was found that such sodium silicate could be prepared by controlling the $SiO_2/Na_2O$ molar ratio n and specific surface area of the sodium silicate. However, there was a problem that when the $SiO_2/Na_2O$ molar ratio n is made smaller, the elution rate of Na ions is made faster, hygroscopicity is increased although its water softening power at the initial stage is increased, it absorbs moisture and turns into a state of glutinous starch syrup during long-time preservation, and under such a state, water softening power is lost.

Thus, the object of the present invention lies in providing powder mainly comprising amorphous sodium silicate, which has large water softening power and small hygroscopicity, and is suitably usable as a detergent builder.

The present inventors have engaged in preparation of sodium silicate cullet from long ago, and have made sequential researches into the production and physical and chemical properties of sodium silicate cullet. As a result, they found that hygroscopicity can be made smaller by making a metal sulfate exist as solid solution in amorphous sodium silicate cullet.

Figure 1:
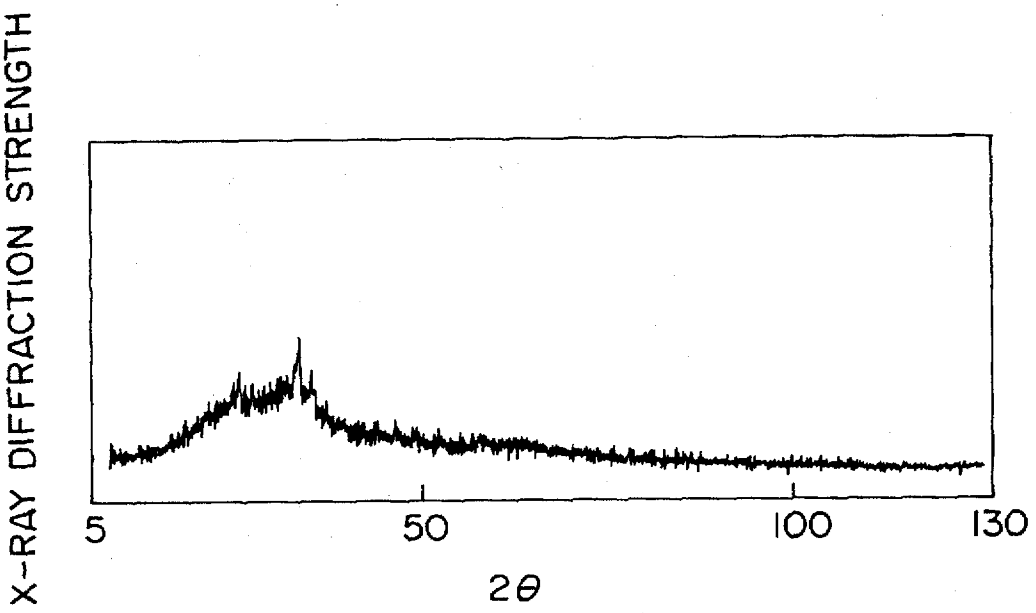
FIG. 1 is the X-ray diffraction pattern of the amorphous sodium silicate-metal sulfate composite powder in the invention obtained in the later-described Example 1.

Thus, according to the present invention there is provided amorphous sodium silicate-metal sulfate composite powder which contains the metal sulfate as solid solution, and is such that when the $SiO_2/Na_2O$ molar ratio is expressed by n and the specific surface area is expressed by S ($m^2/g$), n and S satisfy the following expressions $$1.60 \leqq n \leqq 2.80$$

$$0.10 \leqq S \leqq 2.00$$

, provided that it is assumed that the molar number of $Na_2O$ is the molar number of $Na_2O$ based on sodium silicate, and does not contain the molar number of $Na_2O$ based on sodium sulfate in the case where the metal sulfate is sodium sulfate.

In the invention, the metal sulfate is contained as solid solution in the amorphous sodium silicate-metal sulfate composite powder (hereafter, merely referred to as composite powder). It is presumed that when the composite powder is added to water, the metal sulfate is eluted first and thereby increases the substantial contact area between amorphous sodium silicate and water. It is further presumed that since the contact area with water is increased, when the composite powder is made to exert the same extent of water softening power, $SiO_2/Na_2O$ molar ratio can be enlarged and the $Na_2O$ content can be made smaller, and as a result hygroscopicity is lowered.

As the metal sulfate, there can be used alkali metal sulfates such as lithium sulfate, sodium sulfate, potassium sulfate, rubidium sulfate and cesium sulfate; alkaline earth metal sulfates such as magnesium sulfate, calcium sulfate, strontium sulfate and barium sulfate; aluminum sulfate, etc. In view of a compounding component for detergents, alkali metal sulfates are preferred, and sodium sulfate is further preferred.

The existence amount of the metal sulfate can be determined by analyzing the sulfur element. For example, the sulfur element can be determined by the later-described X-ray fluorometry. It is preferred for increasing the contact area of the composite powder of the invention with water and making it exert good water softening power that the amount of the sulfur element in the composite powder is in the range of 0.3 to 9.0% by. weight. For making it exert better water softening power, the amount of the sulfur element is preferably 0.7 to 7.0% by weight, more preferably 1.0 to 4.0% by weight.

In the composite powder of the invention, the metal sulfate exists as solid solution. However, as to the metal sulfate existing as solid solution, there is an upper limit amount up to which it can exist as solid solution, and the value depends on the kind of metal sulfate and the $SiO_2/Na_2O$ molar ratio of the amorphous sodium silicate. For example, in the case of the metal sulfate being sodium sulfate, the upper limit amount thereon is on the order of about 15 weight %. Therefore, when sodium silicate contains a metal sulfate in an amount larger than its upper limit amount up to which it can exist as solid solution, the phase of the metal sulfate incapable of existing as solid solution deposits in the sodium silicate phase containing the metal sulfate as solid solution to form cullet having separate-phase. Cullet having such separate-phase is whitely turbid. When this cullet is ground, there is a possibility that the metal sulfate phase and the sodium silicate phase containing the metal sulfate as solid solution independently form particles. The composite powder of the invention can be any one so long as it contains amorphous sodium silicate-metal sulfate composite particles which contain the metal sulfate as solid solution. Therefore, for example, it can be one wherein the metal sulfate phase deposits in the amorphous sodium silicate-metal sulfate composite particles which contain the metal sulfate as solid solution, or can be a mixture of the amorphous sodium silicate-metal sulfate composite particles which contain the metal sulfate as solid solution with the metal sulfate particles.

Since the water softening power and hygroscopicity of the composite powder are influenced also by the $SiO_2/Na_2O$ molar ratio in the composite powder as stated above, in the invention, the $SiO_2/Na_2O$ molar ratio n must satisfy the following expression $$1.60 \leqq n \leqq 2.80$$

, provided that it is assumed that the molar number of $Na_2O$ is the molar number of $Na_2O$ based on sodium silicate, and does not contain the molar number of $Na_2O$ based on sodium sulfate in the case where the metal sulfate is sodium sulfate. When n becomes smaller than 1.6, the hygroscopicity becomes large and, moreover, dissolution of silicate ions in the composite powder becomes faster, and Ca ions once bound to silicic acid are eluted again in water, resulting in poor water softening power, which is undesirable. On the other hand, when n becomes larger than 2.80, the Na ions elution amount decreases and the number of sites binding to Ca ions decreases, and as a result, the water softening power becomes smaller, which is undesirable. For making the composite powder exerting better water softening power and preventing its hygroscopicity, it is desirable that n satisfies $1.80 \leqq n \leqq 2.20$.

Further, since the water softening power and hygroscopicity of the composite powder are influenced also by its specific surface area, in the invention, the specific surface area S ($m^2/g$) of the composite powder must satisfy the following expression $$0.10 \leqq S \leqq 2.00$$

When the value of the specific surface area becomes smaller than 0.10 $m^2/g$, the Na elution amount decreases and the water softening power is lowered, which is undesirable. On the other hand, when the value of the specific surface area becomes larger than 2.00 $m^2/g$, dissolution of silicate ions as well as Na elution become faster, the water softening power becomes bad, as is the case where the above molar ratio is low, and, moreover, its hygroscopicity increases, which is undesirable. Further, it is very difficult by a usual grinding method to make the specific surface area larger than 2.00 $m^2/g$. For making the composite powder exerting better water softening power and preventing its hygroscopicity, it is desirable that S satisfies $0.50 \leqq S \leqq 1.50$.

The composite powder of the invention is amorphous. However, this includes not only the case where it is perfectly amorphous but the case where fine crystals of sodium silicate and fine crystals of the metal sulfate are contained in a permissible amount. In the X-ray diffraction pattern of an amorphous substance containing fine crystals, a broad peak is generally observed in the halo pattern due to the amorphous substance. This broad peak is due to fine crystals contained in the amorphous substance. The amount of the fine crystals can be calculated from the area of the broad peak in the halo pattern in comparison with that of the halo pattern. The amorphous sodium silicate-metal sulfate composite powder in the invention means one wherein the fine crystals amount calculated from the broad peak in comparison with that of the halo pattern is under 20% by volume.

In the composite powder of the invention, the average primary particle size calculated from the specific surface area is 1.2 to 24 μm, preferably 3.0 to 12 μm e.g., 1.6 to 12 μm and the average secondary particle size measured using a particle size distribution analyzer based on liquid-phase dispersive sedimentation in which the measurement is taken by the optical transmission method is 1.8 to 45 μm, preferably 2.5 to 22 μm.

The composite powder of the invention can be prepared by any process, but the following preparation process is simple and preferred. The process is one which comprises grinding sodium silicate-metal sulfate composite cullet containing the metal sulfate as solid solution.

The sodium silicate-metal sulfate composite cullet can be prepared, for example, by the following process. The process is one which comprises heat fusing a metal sulfate, $SiO_2$, and sodium carbonate or sodium hydroxide so that the $SiO_2/Na_2O$ molar ratio n in the sodium silicate-metal sulfate composite cullet can satisfy $1.60 < n \leqq 2.80$ provided that it is assumed that the molar number of $Na_2O$ is the molar number of $Na_2O$ based on sodium silicate, and does not contain the molar number of $Na_2O$ based on sodium sulfate in the case where the metal sulfate is sodium sulfate, and then cooling the fused product.

As the metal sulfate, the above-mentioned compounds can be used. The metal sulfate may be either anhydrides or hydrate salts. As $SiO_2$, known materials containing $SiO_2$ as a main component such as quartzite, siliceous sand, cristobalite, fused silica, amorphous silica and silica sol can be used without any limitation. Industrially, siliceous sand is preferably used in view of its cheapness and easy handling. Sodium carbonate or sodium hydroxide as the alkali source can be used alone, or can be used as a mixture at any ratio.

These raw materials are heat fused. Temperature at that time must be in the range of 900° to 1,300° C. When the heat fusion temperature is under 900° C., $SiO_2$ is not fused, the desired sodium silicate-metal sulfate composite cullet is not formed, which is undesirable. Further, when the temperature goes beyond 1,300° C., the metal sulfate is decomposed and the amount of the metal sulfate existing as solid solution is lowered, and its hygroscopicity inhibition effect is lowered, which is undesirable. Further, preferred heat fusing temperature is 1,000° to 1,200° C.

It is economically preferred that the heat fusing time is short, and sufficiently uniform fused matter is formed in 10 hours or less. As to the cooling method for this fused matter, it is sufficient if the cooling is carried out under such a condition that the sodium silicate phase wherein the metal sulfate exists as solid solution is amorphous. In general, such cooling that it is taken out from the fusion state into the environment of room temperature is sufficient. The cooling can be carried out not only by mere air cooling, but by gradual cooling in the furnace or by water cooling.

The sodium silicate-metal sulfate composite cullet obtained by the cooling is then ground, The grinding can be carried out according to a known grinding method. For example, there can be used pulverizers such as ball mills, agitation mills, high speed revolution pulverizers, jet mills, shearing mills and colloid mills. Among them, ball mills can be mentioned as the most general grinder. As specific examples thereof, there can be mentioned rolling mills such as pot mills, tube mills and conical mills; vibrating ball mills such as circular vibrating mills and gyratory vibrating mills; centrifugal ball mills; planetary mills; etc. Further, in order to increase the efficiency of grinding by the above pulverizer, it is preferred to grind or crush the cullet into grains of the order of several mm, before the pulverization operation, using a grinder or crusher such as a jaw crusher, a gyratory crusher, a cone crusher or a hammer crusher.

Further, for heightening the efficiency of grinding, it is possible to use a grinding aid. As grinding aids, known grinding aids such as those mentioned in "Funsai" (grinding) written by the joint authors Naito and Jinbo, No. 29, pp104 (1985) can be used without any limitation. Diethylene glycol and triethanolamine are preferred in view of suitability with the sodium silicate-metal sulfate composite cullet. It is enough that the addition amount of the grinding aid is 1% by weight or less.

The composite powder obtained by the invention exhibits excellent water softening power, and, further, has small hygroscopicity and is also excellent in preservation stability.

The present invention is further detailedly described below by examples and comparative examples, but not limited to these examples. The measured values in the examples and comparative examples were measured according to the following methods.

(1) Quantitative determination of a sulfur element in composite powder

The concentration (% by weight) of a sulfur element in composite powder was measured by a X-ray spectrometer analyzer.

(2) Molar ratio

Composite powder is dissolved in water, the molar number of sodium oxide and the molar number of silica in the solution were measured, respectively, and the molar ratio n was calculated from the ratio between them. The molar number of sodium oxide was determined by neutralization titrating a sample with hydrochloric acid using a Methyl Orange solution as an indicator. The molar number of silica was determined by reacting a sample with sodium fluoride, neutralization titrating sodium hydroxide released with hydrochloric acid, and subtracting an amount corresponding to sodium oxide from the amount of hydrochloric acid used. The reaction formula is as follows.

$H_2SiO_3+6NaF+H_2O \rightarrow Na_2SiF_6+4NaOH$ (4 mols of sodium hydroxide is formed per mol of silica)

(3) Specific surface area S

Measured using the air permeametric method. Specifically, the specific surface area S was calculated by the following Kozeny-Carman's expression.

$$S=(140/\rho)\times((\Delta P\times A\times t)/(\eta\times L\times Q)\times\epsilon^3/(1-\epsilon)^2)^{1/2}$$

wherein $\epsilon$: Fractional voids of the sample packing layer; $\epsilon=1-W/(\rho\times A\times L)$ $\rho$: Density of the powder (g/cm$^2$)

$\eta$: Viscosity coefficient of air (mPa sec)

L: Thickness of the sample layer (cm)

Q: Amount of air permeating the sample later (cm$^3$)

$\Delta P$: Pressure difference at both ends of the sample layer (g/cm$^2$).

A: Cross section of the sample layer (cm$^2$)

t: Time required for Q cm$^3$ of air to permeate the sample layer (sec)

W: Weight of the sample (g)

Herein, L is 1.2 cm, Q is 20 cm$^3$, $\Delta P$ is 30 g/cm$^2$, A is 2 cm$^2$, $\rho$ is the true specific gravity of the cullet and $\eta$ is 0.0182 mPa sec (=mN sec m$^2$) [value at 1 atm and 20° C. described in LANGE'S HANDBOOK CHEMISTRY, 12th Edition, Chapter 10, page 100], and therefore, the specific surface area S can be calculated by measuring W and t.

(4) Amount of fine crystals

When, in the X-ray diffraction pattern of composite powder, a broad peak is observed around 2θ=32°, as shown in FIG. 1, it is possible to calculate the amount of fine crystals from the area of the broad peak. This broad peak is bent from the halo pattern around 2θ=26° and around 2θ=36°. The two bending points were connected by a straight line, and the integrated strength of the broad peak (this value is referred to as $NI_B$) was calculated using the straight line as a background. On the other hand, the point at 2θ=8° and the point at 2θ=125° were connected by a straight line, and the integrated strength of the whole pattern (this value is referred to as $NI_T$) was calculated using the straight line as a background. The amount of the fine crystals was calculated according to the following expression, using the above values.

Amount of fine crystals (% by volume)=$(NI_B/NI_T)\times100$ (5) Water softening power (Calcium binding capacity)

The water softening power of composite powder was expressed by calcium binding capacity. 1 L of 5 mmols/L aqueous calcium chloride solution adjusted to pH 10 with ethanolamine and hydrochloric acid was adjusted to a constant temperature of 20° C. under stirring at 350 r.p.m. Then, 0.2 g of composite powder as a sample was accurately weighed out (unit:g), and added to the above solution. After stirring the mixture at 350 r.p.m. for 15 minutes, 10 ml thereof was taken as a sample and filtered with a filter of 0.2 μm. The Ca concentration in the resultant filtrate was measured by an Inductive Coupled Plasms Atomic Emission Spectrometer (IPC-AES), and the Ca ion amount C (unit:rag) was calculated from the value. The calcium binding capacity was calculated by the following expression.

Ca binding capacity=(20-C) /0.2 (unit: mg/g sample)

(6) hygroscopicity

About 20 g of a sample was put in a resin-made cup, and left alone for 3 days in an air-conditioned room of a temperature of 25° C. and a humidity of 50%, and weight increase ΔW was measured. The amount of moisture absorbed (% by weight) was calculated by the following expression using the ratio between ΔW and the initial weight $W_o$.

The amount of moisture absorbed=$(\Delta W/W_o)\times100$ (unit:% by weight)

EXAMPLE 1

200 g of siliceous sand ($SiO_2$ 99.8%), 176.4 g of sodium carbonate ($Na_2CO_3$ 99%) and 59.1 g of anhydrous sodium sulfate were mixed, and 100 g of water was added, followed by mixing. The mixture was put in a platinum-made crucible, the temperature of the mixture was elevated from room temperature to 1,200° C. in 1.5 hours in an electric furnace, and the mixture was held at 1,200° C. for 3 hours. After the heat fusing, the crucible containing the ignited contents was taken out from the electric furnace, and quenched by immersing the bottom portion thereof in a water bath to give whitely turbid sodium silicate-sodium sulfate composite cullet. The sodium silicate-sodium sulfate composite cullet was crushed by a jaw crusher (clearance: 5 mm). The crushed cullet was then ground with a ball mill (pot : inner diameter 135 mm, capacity 2 L; ball : diameter 30 mm, 33 balls, made of $Al_2O_3$) at a revolution speed of 60 r.p.m. for 1 hour. Thereafter, diethylene glycol was added in an amount of 0.5% by weight of the composite powder, and the mixture was further ground under the same conditions for 65 hours.

The $SiO_2/Na_2O$ molar ratio of the obtained composite powder was 2.00, and the content of the sulfur element based on sodium sulfate was 3.7% by weight. Further, the crystallinity of the composite powder was evaluated by X-ray diffraction, and as a result a halo pattern as shown in FIG. 1 was obtained. A broad peak was observed around $2\theta=32°$, and the amount of fine crystals calculated from the area of the broad peak in the halo pattern in comparison with the halo pattern was 9% by volume. The physical and chemical properties of the composite powder were shown together in Table 1.

EXAMPLE 2

Colorless, transparent sodium silicate-sodium sulfate composite cullet was obtained in the same manner as in Example 1 except that the addition amount of anhydrous sodium sulfate was changed to 26.3 g. The cullet was ground in the same manner as in Example 1 to give composite powder. The physical and chemical properties of the composite powder were shown in Table 1.

EXAMPLE 3

Whitely turbid sodium silicate-sodium sulfate composite cullet was obtained in the same manner as in Example 1 except that the heat fusing temperature was changed to 1,100° C., The cullet was ground in the same manner as in Example 1 to give composite powder. The physical and chemical properties of the composite powder were shown in Table 1.

EXAMPLE 4

Whitely turbid sodium silicate-sodium sulfate composite cullet was obtained in the same manner as in Example 1 except that the mixing amounts of siliceous sand, sodium carbonate and anhydrous sodium sulfate were changed to 200 g, 196 g and 60 g, respectively. The cullet was ground in the same manner as in Example 1 except that the grinding time was changed to 140 hours to give composite powder. The physical and chemical properties of the composite powder were shown in Table 1.

EXAMPLE 5

Colorless, transparent sodium silicate sodium sulfate composite cullet was obtained in the same manner as in Example 1 except that the mixing amounts of siliceous sand, sodium carbonate and anhydrous sodium sulfate were changed to 200 g, 168 g and 25 g, respectively. The cullet was ground in the same manner as in Example 1 to give composite powder. The physical and chemical properties of the composite powder were shown in Table 1.

Comparative example 1

Colorless, transparent sodium silicate cullet was obtained in the same manner as in Example 1 except that the mixing amounts of siliceous sand and sodium carbonate were changed to 187.5 g and 212.5 g, respectively, and anhydrous sodium sulfate was not used. The cullet was ground in the same manner as in Example 1 to give amorphous sodium silicate powder. The physical and chemical properties thereof were shown in Table 1.

Comparative example 2

Colorless, transparent sodium silicate cullet was obtained in the same manner as in Example 1 except that the mixing amounts of siliceous sand and sodium carbonate were changed to 177 g and 223 g, respectively, and anhydrous sodium sulfate was not used. The cullet was ground in the same manner as in Example 1 to give amorphous sodium silicate powder. The physical and chemical properties thereof were shown in Table 1.

EXAMPLE 6

Whitely turbid sodium silicate-sodium sulfate composite cullet was obtained in the same manner as in Example 1 except that the mixing amounts of siliceous sand, sodium carbonate and anhydrous sodium sulfate were changed to 200 g, 160 g and 50 g, respectively. The cullet was ground in the same manner as in Example 1 except that the addition amount of diethylene glycol was changed to the amount shown in Table 1 and the grinding time was changed to 110 hours to give composite powder. The physical and chemical properties of the composite powder were shown in Table 1.

EXAMPLE 7

Whitely turbid sodium silicate-sodium sulfate composite cullet was obtained in the same manner as in Example 1 except that the mixing amounts of siliceous sand, sodium carbonate and anhydrous sodium sulfate were changed to 150 g, 139 g and 47 g, respectively. The cullet was ground in the same manner as in Example 1 except that the addition amount of diethylene glycol was changed to the amount shown in Table 1 and the grinding time was changed to 80 hours to give composite powder. The physical and chemical properties of the composite powder were shown in Table 1.

EXAMPLE 8

Whitely turbid sodium silicate-sodium sulfate composite cullet was obtained in the same manner as in Example 1 except that the mixing amounts of siliceous sand, sodium carbonate and anhydrous sodium sulfate were changed to 200 g, 196 g and 60 g, respectively. The cullet was ground in the same manner as in Example 1 except that the addition amount of diethylene glycol was changed to the amount shown in Table 1 and the grinding time was changed to 10 hours to give composite powder. The physical and chemical properties of the composite powder were shown i n Table 1.

Comparative example 3

Colorless, transparent sodium silicate cullet was obtained in the same manner as in Example 1 except that the mixing amounts of siliceous sand and sodium carbonate were changed to 200 g and 176 g, respectively, and anhydrous sodium sulfate was not used. The cullet was ground by a jaw crusher (clearance 5 mm). The ground cullet was successively ground by the same ball mill as used in Example 1, at a revolution speed of 60 r.p.m. for 120 minutes. Finally, the powder obtained by the grinding was passed through a sieve of 100 meshes, and as a result, 91% by weight thereof was passed. The physical and chemical properties of the amorphous sodium silicate powder were shown in Table 1.

Comparative example 4

Colorless, transparent sodium silicate cullet was obtained in the same manner as in Example 1 except that the mixing amounts of siliceous sand and sodium carbonate were changed to 230 g and 169 g, respectively, and anhydrous sodium sulfate was not used. The cullet was ground by a jaw crusher (clearance 5 mm). The ground cullet was successively ground by the same ball mill as used in Example 1, at a revolution speed of 60 r.p.m. for 100 minutes. Finally, the powder obtained by the grinding was passed through a sieve of 65 meshes, and as a result, 100% by weight thereof was passed. The physical and chemical properties of the amorphous sodium silicate powder were shown in Table 1.

Comparative example 5

Composite powder was obtained in the same manner as in Example 8 except that the grinding time by the ball mill was changed to 3 hours. The physical and chemical properties of the composite powder were shown in Table 1.

TABLE 1

| | | | Amorphous sodium silicate-sodium sulfate composite powder | | | | | | | |
|---|---|---|---|---|---|---|---|---|---|---|
| | Fusing temperature (°C.) | DEG*[1] addition amount at grinding (wt %) | Content of sulfur element (wt %) | Molar ratio | Specific surface area ($m^2/g$) | Average primary particle size*[2] (μm) | Average secondary particle size*[3] (μm) | Amount of fine crystals (vol %) | Ca binding capacity (mg/g) | Moisture absorption amount (wt %) |
| Example 1 | 1200 | 0.5 | 3.7 | 2.00 | 0.86 | 2.8 | 6.2 | 9 | 35 | 16.2 |
| Example 2 | 1200 | 0.5 | 1.8 | 2.00 | 1.01 | 2.4 | 3.9 | 8 | 38 | 13.8 |
| Example 3 | 1100 | 0.5 | 3.7 | 2.00 | 1.06 | 2.3 | 5.5 | 10 | 35 | 15.9 |
| Example 4 | 1200 | 0.5 | 3.6 | 1.80 | 1.04 | 2.3 | 5.1 | 10 | 50 | 19.4 |
| Example 5 | 1200 | 0.5 | 1.7 | 2.10 | 1.04 | 2.3 | 4.4 | 7 | 33 | 13.2 |
| Example 6 | 1200 | 0.6 | 3.8 | 1.90 | 1.02 | 2.4 | 3.9 | 9 | 40 | 16.1 |
| Example 7 | 1200 | 0.5 | 2.5 | 1.80 | 0.95 | 2.5 | 4.2 | 9 | 38 | 20.4 |
| Example 8 | 1200 | 0.8 | 3.6 | 1.80 | 0.27 | 8.9 | 16 | 10 | 29 | 16.0 |
| Com. Example 1 | 1200 | 0.5 | 0 | 2.00 | 0.55 | 4.4 | 7.0 | 8 | 6 | 15.0 |
| Com. Example 2 | 1200 | 0.5 | 0 | 1.40 | 0.39 | 6.2 | 10.9 | 10 | 54 | 31.8 |
| Com. Example 3 | 1300 | 0 | 0 | 2.00 | 0.08 | 30 | 55 | — | 4.4 | 12.5 |
| Com. Example 4 | 1300 | 0 | 0 | 2.40 | 0.06 | 40 | 76 | — | 1.5 | 11.1 |
| Com. Example 5 | 1200 | 0.8 | 3.6 | 1.80 | 0.06 | 40 | 75 | 10 | 17 | 15.0 |

*[1]DEG represents diethylene glycol.

*[2]Average primary particle size is a value obtained from the value of specific surface area according to sphere approximate calculation.

*[3]Average secondary particle size is a value measured by a particle size distribution analyzer.

What is claimed is:

1. Amorphous sodium silicate-metal sulfate composite powder which contains the metal sulfate as solid solution, and is such that when the $SiO_2/Na_2O$ molar ratio is expressed by n and the specific surface area is expressed by S ($m^2/g$), n and S satisfy the following expressions $$1.60 \leqq n \leqq 2.80$$

$$0.10 \leqq S \leqq 2.00$$

, provided that the molar number of $Na_2O$ is the molar number of Na20 based on sodium silicate, and does not contain the molar number of $Na_2O$ based on sodium sulfate in the case where the metal sulfate is sodium sulfate;

wherein the metal sulfate is contained in an amount of 0.3 to 9.0% by weight in terms of a sulfur element and wherein said composite powder has an average primary particle size of 1.2 to 12 μm and an average secondary particle size of 1.8 to 22 μm.

2. The amorphous sodium silicate-metal sulfate composite powder according to claim 1, wherein the $SiO_2/Na_2O$ molar ratio n satisfies the following expression $$1.80 \leqq n \leqq 2.20.$$

3. The amorphous sodium silicate-metal sulfate composite powder according to claim 1, wherein the specific surface area S ($m^2/g$) satisfies the following expression $$0.50 \leqq S \leqq 1.50.$$

4. The amorphous sodium silicate-metal sulfate composite powder according to claim 1, wherein the metal sulfate is an alkali metal sulfate, an alkaline earth metal sulfate or aluminum sulfate.

5. The amorphous sodium silicate-metal sulfate composite powder according to claim 4, wherein the alkali metal sulfate is lithium sulfate, sodium sulfate, potassium sulfate, rubidium sulfate or cesium sulfate.

6. The amorphous sodium silicate-metal sulfate composite powder according to claim 1, wherein the metal sulfate is contained in an amount of 0.7 to 7.0% by weight in terms of a sulfur element.

7. The amorphous sodium silicate-metal sulfate composite powder according to claim 1, wherein the metal sulfate is contained in an amount of 1.0 to 4.0% by weight in terms of a sulfur element.

8. The amorphous sodium silicate-metal sulfate composite powder according to claim 1, wherein the amount of fine crystals thereof, calculated from the area of the broad peak in the X-ray diffraction halo pattern in comparison with the halo pattern, is under 20% by volume.

9. The amorphous sodium silicate-metal sulfate composite powder according to claim 1, wherein its average primary particle size is 1.6 to 12 μm.

10. The amorphous sodium silicate-metal sulfate composite powder according to claim 1, wherein its average secondary particle size is 2.5 to 22 μm.

11. A detergent builder comprising the amorphous sodium silicate-metal sulfate composite powder according to claim 1.

* * * * *